(12) United States Patent
Takahashi et al.

(10) Patent No.: US 10,702,995 B2
(45) Date of Patent: *Jul. 7, 2020

(54) GRIPPING TOOL, GRIPPING SYSTEM, AND METHOD FOR MANUFACTURING GRIPPER

(71) Applicant: KABUSHIKI KAISHA TOSHIBA, Minato-ku (JP)

(72) Inventors: Hiromasa Takahashi, Minato (JP); Yoko Tokuno, Yokohama (JP); Kenta Fukatsu, Fujisawa (JP); Emiko Ishida, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,364

(22) Filed: Mar. 25, 2019

(65) Prior Publication Data

US 2019/0217486 A1    Jul. 18, 2019

Related U.S. Application Data

(63) Continuation of application No. PCT/JP2017/034350, filed on Sep. 22, 2017.

(30) Foreign Application Priority Data

Mar. 13, 2017   (JP) ................................ 2017-047890

(51) Int. Cl.
  *B25J 15/06*   (2006.01)
  *B29C 43/18*   (2006.01)
  (Continued)

(52) U.S. Cl.
  CPC ........... *B25J 15/0616* (2013.01); *B25J 15/06* (2013.01); *B25J 15/08* (2013.01); *B29C 43/18* (2013.01);
  (Continued)

(58) Field of Classification Search
  CPC ................. B25J 15/0033; B25J 15/0608; B25J 15/0023; B25J 15/08; B25J 15/0009;
  (Continued)

(56) References Cited

U.S. PATENT DOCUMENTS 4,294,424 A * 10/1981 Teissier ................ B25B 11/007
                                                       248/205.9
4,561,686 A * 12/1985 Atchley ................ B66C 1/0206
                                                        294/188

(Continued)

FOREIGN PATENT DOCUMENTS

JP    56-114688 A    9/1981
JP    9-123082 A     5/1997

(Continued)

OTHER PUBLICATIONS

T. Mimura, et al., "Development of Absorption Gripper Array Imitating Octopus—Gripping step and Curved Surface Dimensions—" DVD-ROM of the 34th Annual Conference of the Robotics Society of Japan, Sep. 2016, 9 pages (with English translation).

*Primary Examiner* — Stephen A Vu
(74) *Attorney, Agent, or Firm* — Oblon, McClelland, Maier & Neustadt, L.L.P.

(57) ABSTRACT

According to one embodiment, a gripping tool includes a gripper. The gripper is flexible. A granular material is provided in an interior of the gripper. The gripping tool grips a workpiece by depressurizing the interior of the gripper in a state in which the gripper is caused to contact the workpiece. The gripper includes a first portion contacting the workpiece, a second portion opposing the first portion, and a fibrous membrane having a plurality of pores and being provided between the first portion and the second portion. A diameter of at least a portion of the pores is smaller than a diameter of the granular material. The granular material is (Continued)

provided between the fibrous membrane and the second portion.

22 Claims, 10 Drawing Sheets

(51) Int. Cl.
*B25J 15/08* (2006.01)
*B29L 31/00* (2006.01)
*D01D 5/00* (2006.01)

(52) U.S. Cl.
CPC ....... *B29C 43/183* (2013.01); *B29L 2031/748* (2013.01); *D01D 5/0007* (2013.01); *D01D 5/0076* (2013.01)

(58) Field of Classification Search
CPC ...... B25J 15/0246; B25J 9/14; B25J 15/0616; B25J 15/06; A61F 2/586; A61F 2/588; B29C 43/18; B29C 43/183; B29L 2031/748; D01D 5/0007; D01D 5/0076
See application file for complete search history.

(56) References Cited

U.S. PATENT DOCUMENTS

| | | | |
|---|---|---|---|
| 6,846,029 B1* | 1/2005 | Ragner | B25B 9/00 294/219 |
| 8,882,165 B2* | 11/2014 | Lipson | B25J 15/0023 294/188 |
| 2009/0242719 A1* | 10/2009 | Carnevali | F16B 47/00 248/346.2 |
| 2010/0054903 A1* | 3/2010 | Jones | B25J 15/0023 414/800 |
| 2013/0106127 A1 | 5/2013 | Lipson et al. | |
| 2013/0280493 A1 | 10/2013 | Jackson | |

FOREIGN PATENT DOCUMENTS

| | | |
|---|---|---|
| JP | 2006-141564 A | 6/2006 |
| JP | 2008-528408 A | 7/2006 |
| JP | 2012-176476 | 9/2012 |
| JP | 2013-523478 A | 6/2013 |
| JP | 2013-220658 A | 10/2013 |
| JP | 2014-205207 A | 10/2014 |
| JP | 2018-79561 | 5/2018 |
| WO | WO 2015/006613 A1 | 1/2015 |

* cited by examiner

GRIPPING TOOL, GRIPPING SYSTEM, AND METHOD FOR MANUFACTURING GRIPPER

CROSS-REFERENCE TO RELATED APPLICATIONS

This is a continuation application of International Application PCT/JP2017/034350, filed on Sep. 22, 2017. This application also claims priority to Japanese Application No. 2017-047890, filed on Mar. 13, 2017. The entire contents of which are incorporated herein by reference.

FIELD

Embodiments described herein relate generally to a gripping tool, a gripping system, and a method for manufacturing a gripper.

BACKGROUND

There is a gripping tool that includes a gripper having a granular material provided in its interior. When the gripper of the gripping tool ruptures and the granular material of the interior scatters into the periphery, it is necessary to repair the gripping tool and clean the periphery of the gripping tool. As a result, the work efficiency decreases greatly.

Therefore, it is desirable to develop a gripping tool in which the scattering of the granular material can be suppressed when the gripper ruptures.

DETAILED DESCRIPTION

Figure 1:
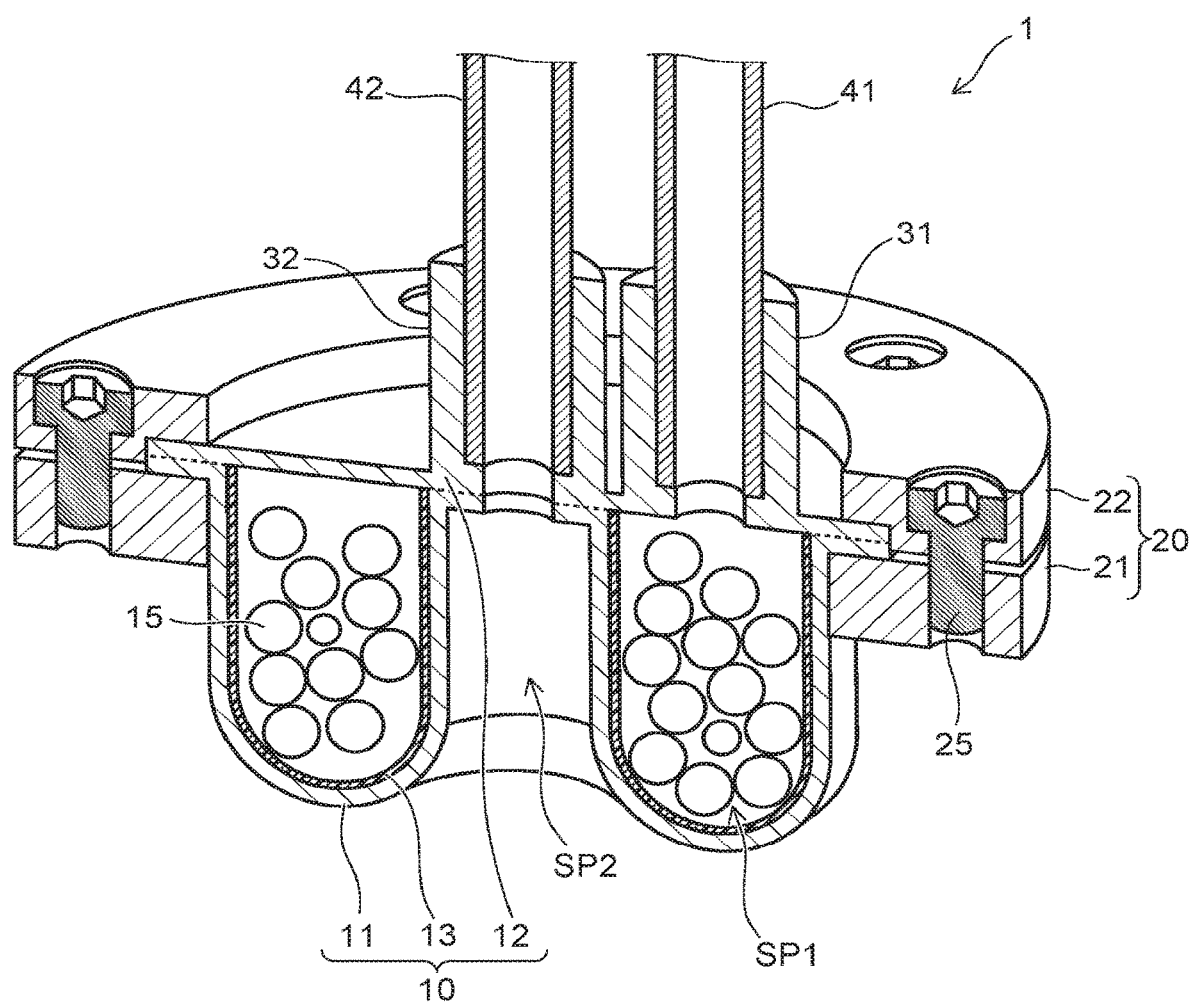
FIG. 1 is a perspective cross-sectional view illustrating a gripping tool according to an embodiment.

According to one embodiment, a gripping tool includes a gripper. The gripper is flexible. A granular material is provided in an interior of the gripper. The gripping tool grips a workpiece by depressurizing the interior of the gripper in a state in which the gripper is caused to contact the workpiece. The gripper includes a first portion contacting the workpiece, a second portion opposing the first portion, and a fibrous membrane having a plurality of pores and being provided between the first portion and the second portion. A diameter of at least a portion of the pores is smaller than a diameter of the granular material. The granular material is provided between the fibrous membrane and the second portion.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a perspective cross-sectional view illustrating a gripping tool 1 according to an embodiment.

The gripping tool 1 according to the embodiment includes a gripper 10 that is flexible. A granular material 15 is provided in the interior of the gripper 10.

More specifically, the gripper 10 includes a first portion 11, a second portion 12, and a fibrous membrane 13. The first portion 11 contacts the workpiece to be gripped. The second portion 12 opposes the first portion 11. The fibrous membrane 13 is provided between the first portion 11 and the second portion 12. The granular material 15 is provided between the second portion 12 and the fibrous membrane 13. For example, the first portion 11 and the second portion 12 are bonded via a bonding agent. The gripper 10 is configured thereby. The first portion 11 and the second portion 12 may be bonded by thermal compression bonding.

The fibrous membrane 13 includes multiple micro resin fibers entangled in a membrane configuration. The diameter of each resin fiber is about 50 nm to 10 µm. The fibrous membrane 13 has many pores. The diameter of the pore is smaller than the diameter of the granular material 15. Therefore, the granular material 15 does not move into the region between the first portion 11 and the fibrous membrane 13 and remains between the second portion 12 and the fibrous membrane 13.

For example, the multiple resin fibers extend in undesignated directions. Or, the multiple resin fibers may extend in designated directions. Or, a portion of the multiple resin fibers may extend in one direction; and another portion of the multiple resin fibers may extend in another direction.

The outer perimeter of the first portion 11 and the outer perimeter of the second portion 12 are held by a holder 20. Thereby, a first space SP1 between the first portion 11 and the second portion 12 is separated from an external space.

The fibrous membrane 13 is provided along the inner surface of the first portion 11. For example, the fibrous membrane 13 is bonded to the inner surface of the first portion 11. Or, a portion of the fibrous membrane 13 may be bonded to the inner surface of the first portion 11; and another portion of the fibrous membrane 13 may be provided to be separated from the first portion 11.

The holder 20 has, for example, a circular ring configuration. Only the outer perimeter of the gripper 10 is held by the holder 20. Thereby, the gripper 10 can deform inside the holder 20 in the direction of a line connecting the first portion 11 and the second portion 12.

The direction of the line connecting the first portion 11 and the second portion 12 is, for example, the vertical direction. The direction of the line connecting the first portion 11 and the second portion 12 includes a first direction (up) from the first portion 11 toward the second portion 12, and a second direction (down) from the second portion 12 toward the first portion 11. Hereinbelow, the description of the embodiments is performed using "vertical direction," "up/above," and "down/below" based on the positional relationship between the first portion 11 and the second portion 12.

As an example, the holder 20 includes a first flange 21 and a second flange 22. The first flange 21 abuts the outer perimeter lower surface of the first portion 11. The second flange 22 abuts the outer perimeter upper surface of the second portion 12. The gripper 10 is held by fastening the first flange 21 and the second flange 22 using a fastener 25 such as a screw, etc.

Figure 2:
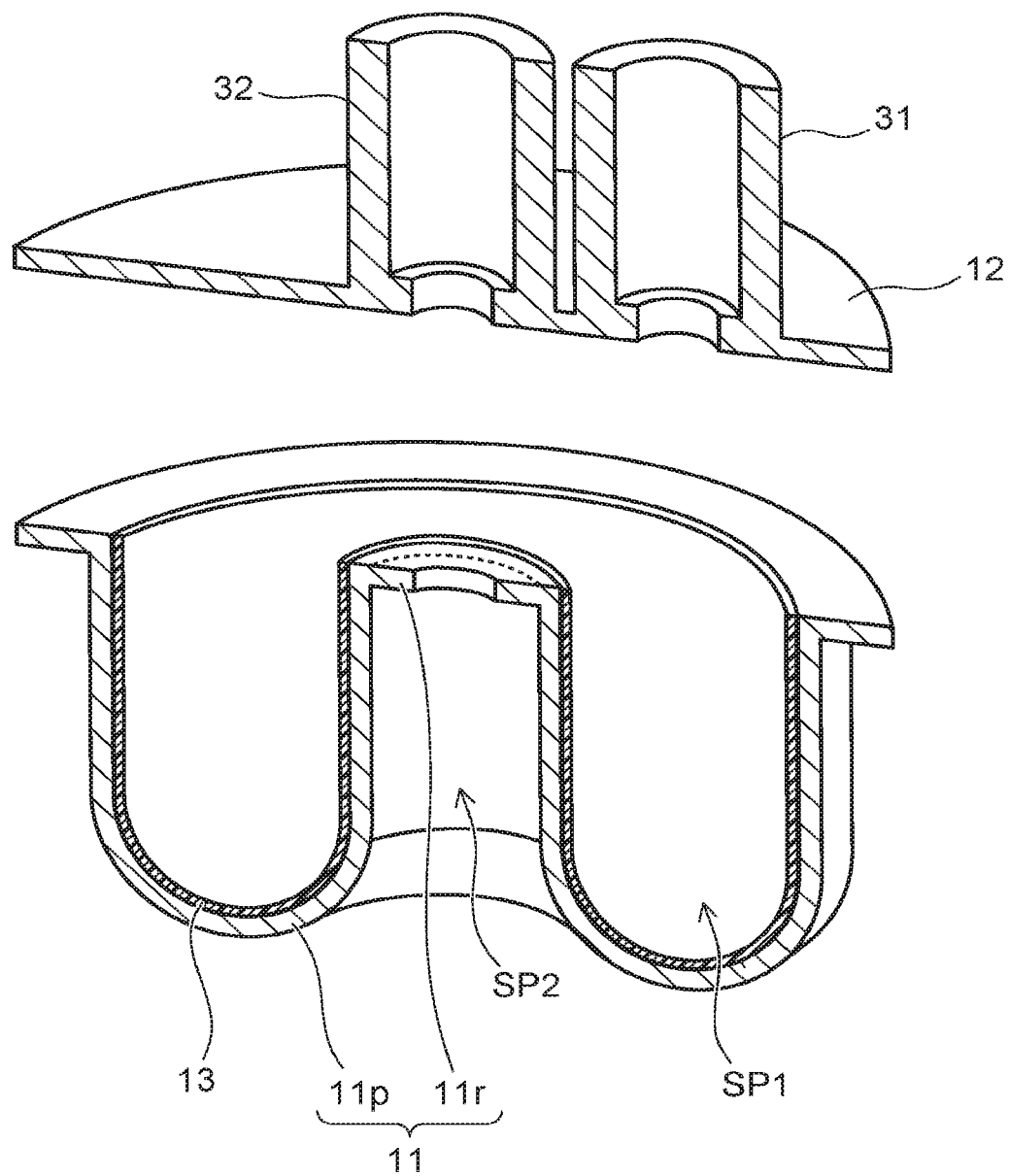
FIG. 2 is a perspective cross-sectional view illustrating the gripper of the gripping tool according to the embodiment.

FIG. 2 is a perspective cross-sectional view illustrating the gripper 10 of the gripping tool 1 according to the embodiment.

The first portion 11, the fibrous membrane 13, and the second portion 12 are illustrated as being separated in FIG. 2.

As illustrated in FIG. 2, the first portion 11 includes a concave portion 11r and a convex portion 11p. The concave portion 11r is recessed upward. The concave portion 11r is provided at the center of the gripper 10. The upper surface of the concave portion 11r contacts the second portion 12. The convex portion 11p protrudes downward. The convex portion 11p is provided around the concave portion 11r. The concave portion 11r and the convex portion 11p are continuous with each other.

The concave portion 11r contacts the second portion 12. The convex portion 11p is separated from the second portion 12 in the vertical direction. Accordingly, in the gripping tool 1 illustrated in FIG. 1 and FIG. 2, the first space SP1 is formed between the convex portion 11p and the second portion 12. The fibrous membrane 13 is bonded to the inner surface of the convex portion 11p.

The configuration and the arrangement of the fibrous membrane 13 are not limited to the example illustrated in FIG. 1 and FIG. 2. For example, the fibrous membrane 13 may be provided at only a portion of the inner surface of the convex portion 11p. Or, a portion of the fibrous membrane 13 may be provided between the concave portion 11r and the second portion 12. Another portion of the fibrous membrane 13 may be clamped between the outer perimeter of the first portion 11 and the outer perimeter of the second portion 12.

A second space SP2 that is surrounded with the concave portion 11r and the convex portion 11p is formed below the first portion 11. Specifically, the top of the second space SP2 is covered with the concave portion 11r. The side of the second space SP2 is surrounded with the convex portion 11p. The bottom of the second space SP2 is open. As described below, the second space SP2 is sealed by the workpiece to be gripped being positioned below the second space SP2.

As illustrated in FIG. 1 and FIG. 2, the gripper 10 further includes a first port 31 and a second port 32. The first port 31 communicates with the first space SP1. The second port 32 pierces the second portion 12 and the concave portion 11r of the first portion 11 and communicates with the second space SP2. A first pipe 41 for depressurizing the first space SP1 is connected to the first port 31. A second pipe 42 for depressurizing the second space SP2 is connected to the second port 32.

The first portion 11 and the second portion 12 include a flexible material such as a resin, etc. The fibrous membrane 13 includes pores. The first portion 11 and the second portion 12 do not include pores. Therefore, the airtightness of the gripper 10 is maintained by the first portion 11 and the second portion 12.

FIGS. 3A to 3D are cross-sectional views illustrating a gripping method using the gripping tool 1 according to the embodiment.

FIGS. 3A to 3D illustrate a case where a workpiece W to be gripped has a cross section in which three triangles are connected.

Figure 3A:
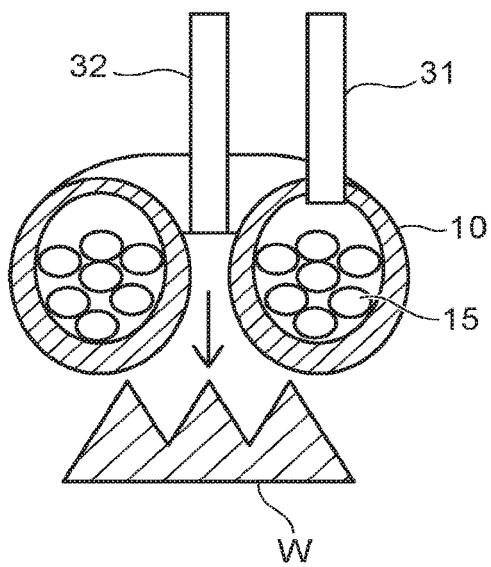
FIGS. 3A to 3D are cross-sectional views illustrating a gripping method using the gripping tool according to the embodiment.

First, the position in the horizontal direction of the gripper 10 and the position in the horizontal direction of the workpiece W are aligned. When the position of the gripper 10 and the position of the workpiece W are aligned, the gripper 10 is lowered toward the workpiece W as illustrated in FIG. 3A.

Figure 3B:
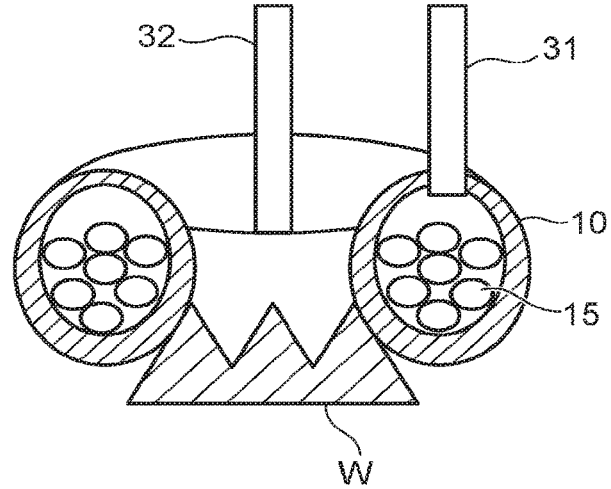

The gripper 10 is flexible. When the gripper 10 contacts the workpiece W, the convex portion 11p of the first portion 11 is pressed outward to envelope the workpiece W as illustrated in FIG. 3B. The second space SP2 that was open is sealed by the workpiece W.

Figure 3C:
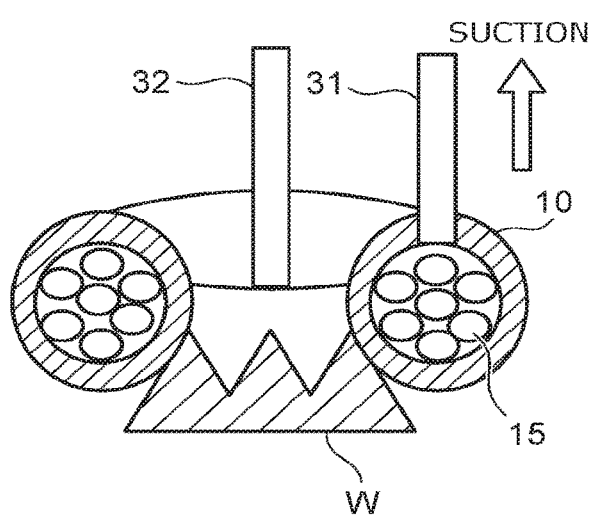

Then, the lowering of the gripper 10 is stopped. As illustrated in FIG. 3C, the first space SP1 is depressurized via the first port 31 and the first pipe 41. For example, the first space SP1 is depressurized to about 0.1 atmosphere. The granular material 15 in the first space SP1 jams and solidifies. The configuration of the gripper 10 enveloping the workpiece W and in close contact with the workpiece W is fixed thereby; and a force for gripping the workpiece W is generated.

The first portion 11 and the fibrous membrane 13 may be separated. In such a case, the first portion 11 is in close contact with the fibrous membrane 13 by the space between the first portion 11 and the fibrous membrane 13 being depressurized via the pores of the fibrous membrane 13. Accordingly, in such a case as well, the configuration of the gripper 10 is fixed similarly; and the workpiece W can be gripped.

Figure 3D:
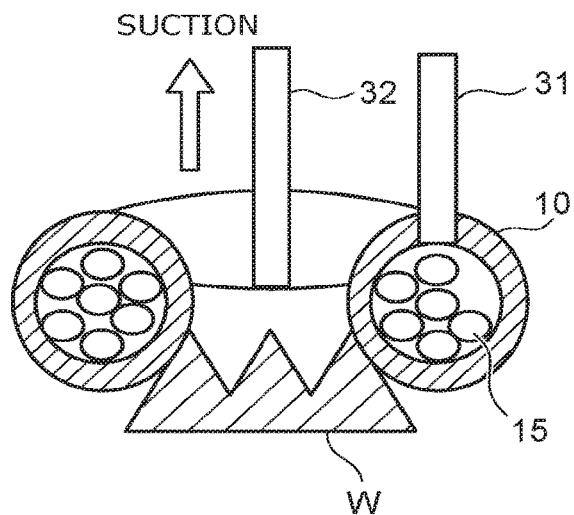

Then, as illustrated in FIG. 3D, the second space SP2 is depressurized via the second port 32 and the second pipe 42. For example, the second space SP2 is depressurized to about 0.1 atmosphere. Thereby, the workpiece W is pulled by suction toward the second space SP2; and the gripping force is increased further.

Subsequently, the gripping tool 1 that grips the workpiece W is lifted. The gripping tool 1 is moved in the horizontal direction. After the workpiece W is transferred to the prescribed position, the first space SP1 and the second space SP2 are opened to the atmosphere. Thereby, the gripping force is eliminated; and the workpiece W is released from the gripping tool 1. By the method described above, the workpiece W to be gripped is transferred to the prescribed position.

Figure 4A:
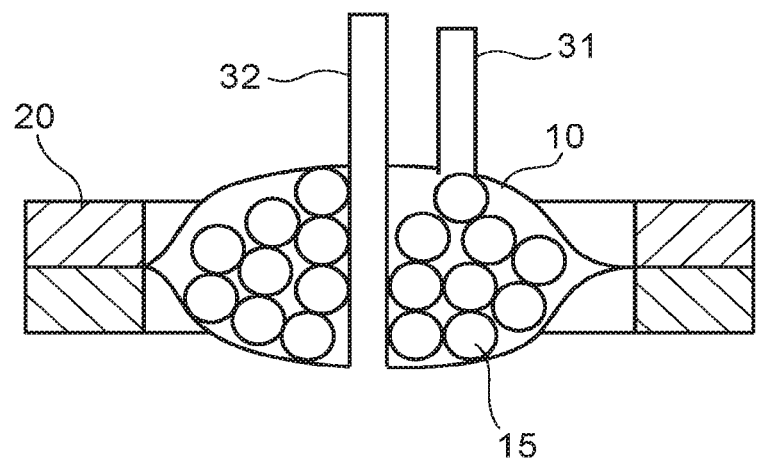
FIGS. 4A to 4C are cross-sectional views illustrating the gripping mechanism of the gripping tool according to the embodiment.
Figure 4B:
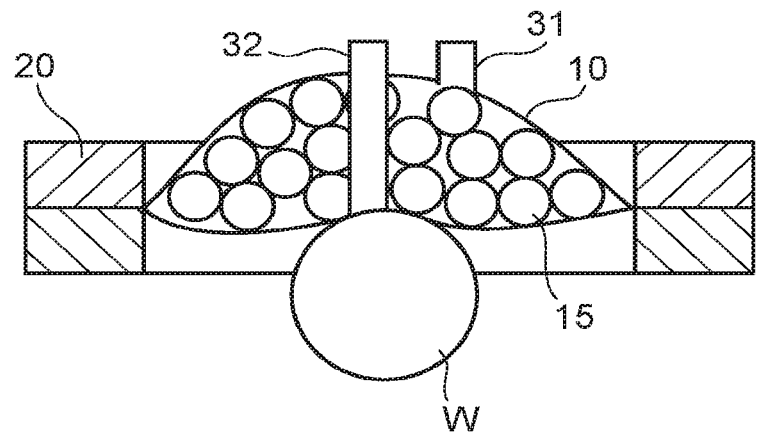
Figure 4C:
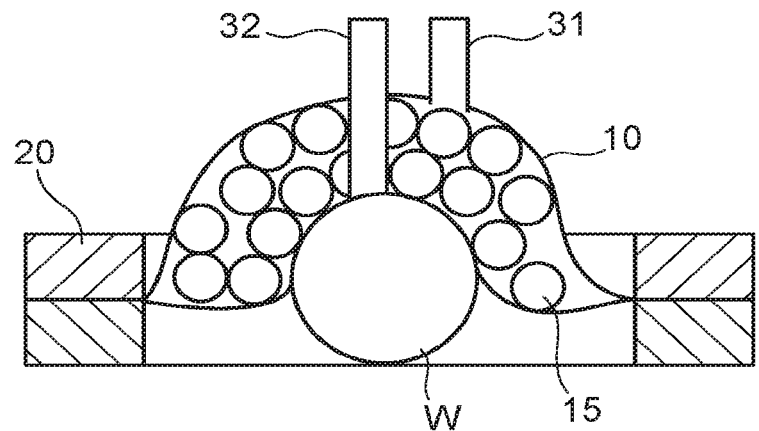

FIGS. 4A to 4C are cross-sectional views illustrating the gripping mechanism of the gripping tool 1 according to the embodiment.

The gripper 10 of the gripping tool 1 is partially simplified in FIGS. 4A to 4C.

In the gripping tool 1 according to the embodiment as illustrated in FIG. 4A, the outer perimeter of the gripper 10 is held by the holder 20. Accordingly, as illustrated in FIG. 4B, the gripper 10 can deform upward with respect to the workpiece W when the gripper 10 is caused to contact the workpiece W.

As illustrated in FIG. 4C, the gripper 10 is deformed further upward with respect to the workpiece W by sucking air via the first port 31 and the second port 32 in this state. The contact surface area between the gripper 10 and the workpiece W increases.

As described above, the gripper 10 is held by the holder 20 to be deformable upward with respect to the workpiece W. According to this configuration, the gripping force can be increased when the workpiece W is gripped by the gripper 10.

Figure 5A:
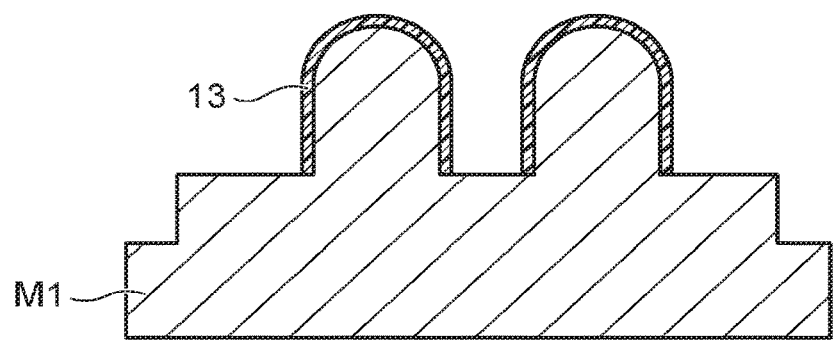
FIGS. 5A to 5C are process cross-sectional views illustrating a portion of the manufacturing processes of the gripper of the gripping tool according to the embodiment.
Figure 5B:
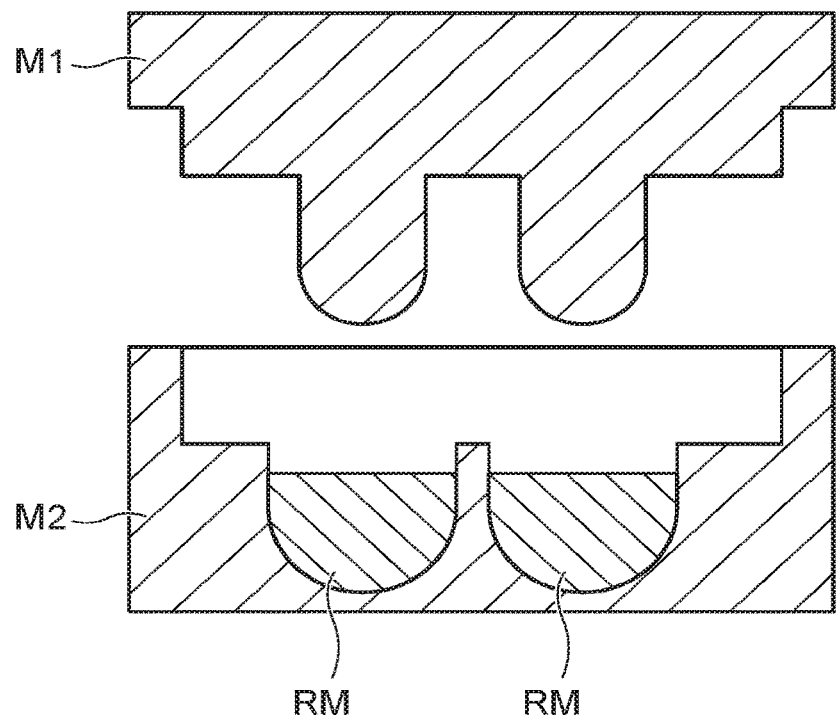
Figure 5C:
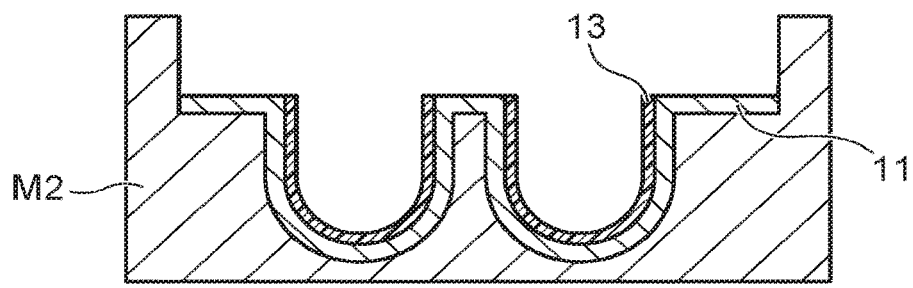

FIGS. 5A to 5C are process cross-sectional views illustrating a portion of the manufacturing processes of the gripper 10 of the gripping tool 1 according to the embodiment.

Here, a case is described where the fibrous membrane 13 is provided along the entire surface of the first portion 11.

First, one set of molds M1 and M2 conforming to the configuration of the first portion 11 is prepared. Then, as illustrated in FIG. 5A, for example, the fibrous membrane 13 is formed on the surface of the male-type mold M1 (a first mold). For example, the fibrous membrane 13 is formed using electrospinning. Continuing, the fibrous membrane 13 that is formed is peeled from the mold M1. The fibrous membrane 13 that conforms to the configurations of the molds M1 and M2 is formed thereby.

The fibrous membrane 13 includes a high polymer material such as polypropylene, polyethylene, polystyrene, polyethylene terephthalate, polyvinyl chloride, polycarbonate, nylon, aramid, polyacrylate, polymethacrylate, polyimide, polyamide-imide, polyvinylidene fluoride, polyethersulfone, etc.

Continuing as illustrated in FIG. 5B, for example, a resin material RM that includes the high polymer material used as the source material of the first portion 11 is disposed in the female-type mold M2 (a second mold). At this time, the resin material RM may be a liquid or a gel. The resin material RM includes a high polymer material such as a silicone resin, a rubber material, an acrylic resin, etc.

Continuing, the molds M1 and M2 are caused to engage and are pressed. Thereby, the resin material RM of the first portion 11 spreads and is filled between the molds M1 and M2. The first portion 11 is made by curing the resin material RM in this state.

Then, as illustrated in FIG. 5C, the fibrous membrane 13 that was made previously is adhered to the first portion 11 that is made. At this time, the fibrous membrane 13 is adhered to the surface of the first portion 11 where the mold M1 was disposed. Continuing, the granular material 15 is disposed inside the first portion 11 and the fibrous membrane 13. The gripper 10 is made by overlaying the first portion 11 and the second portion 12. The granular material 15 may include, for example, microbeads, silicone resin beads, coffee beans, glass beads, etc. Subsequently, the gripper 10 is held by the holder 20. The gripping tool 1 illustrated in FIG. 1 and FIG. 2 is made.

Here, the first portion 11 is made after the fibrous membrane 13 is formed. The order of these formation processes is arbitrary. According to the configuration of the fibrous membrane 13, the fibrous membrane 13 may be formed on only a portion of the surface of the mold M1 in the process illustrated in FIG. 5A.

Effects of the embodiment will now be described.

As described above, the gripping tool 1 causes the gripper 10 to contact the workpiece W, causes the granular material in the interior to jam, and transfers the workpiece W. Therefore, large stresses and large friction forces from the interior and the exterior are applied to the gripper 10. When a crack occurs and the gripper 10 ruptures due to these forces applied to the gripper 10, the granular material that is provided in the interior scatters. Accordingly, when the gripper 10 ruptures, time is necessary not only to repair the gripping tool 1 but also to clean the periphery of the gripping tool 1. The work efficiency is greatly reduced thereby.

In the gripper 10 of the embodiment, the fibrous membrane 13 is provided between the first portion 11 and the second portion 12. The fibrous membrane 13 is provided in the gripper 10; and the granular material 15 is provided between the second portion 12 and the fibrous membrane 13. The granular material 15 is supported by the fibrous membrane 13. Therefore, even in the case where the first portion 11 ruptures, the scattering of the granular material 15 is suppressed. The work that is performed by the gripping tool 1 can be restarted by repairing the gripper 10.

The fibrous membrane 13 has pores. Therefore, the air between the first portion 11 and the fibrous membrane 13 also is suctioned when suctioning the air from the first port 31. The granular material 15 contacts the first portion 11 via the fibrous membrane 13. Accordingly, even in the case where the fibrous membrane 13 is provided, the decrease of the gripping force of the gripping tool 1 can be suppressed.

The diameter of the pores of the fibrous membrane 13 is smaller than the diameter of the granular material 15. Therefore, the granular material that is provided between the second portion 12 and the fibrous membrane 13 does not move into the region between the first portion 11 and the fibrous membrane 13. The undesirable external scattering of the granular material 15 when the first portion 11 ruptures can be prevented more reliably thereby.

According to the embodiment, a gripping tool can be provided in which the scattering of the granular material 15 when the gripper 10 ruptures can be suppressed while suppressing the decrease of the gripping force of the gripper 10.

According to the embodiment, the scattering of the granular material 15 can be suppressed by the fibrous membrane 13 even when the gripper 10 ruptures. In the embodiment, the gripper 10 is deformable upward with respect to the workpiece W when gripping the workpiece W. The gripping force can be increased thereby. Accordingly, by applying the embodiment to the gripping tool 1, the gripping force can be increased while suppressing the rupturing of the gripper 10.

The gripping tool according to the embodiment is not limited to the gripping tool illustrated in FIG. 1 and FIG. 2. Various modifications are possible as described below. In the gripping tools described below as well, the crack propagation time can be increased because the gripper 10 includes the fibrous membrane 13.

Figure 6:
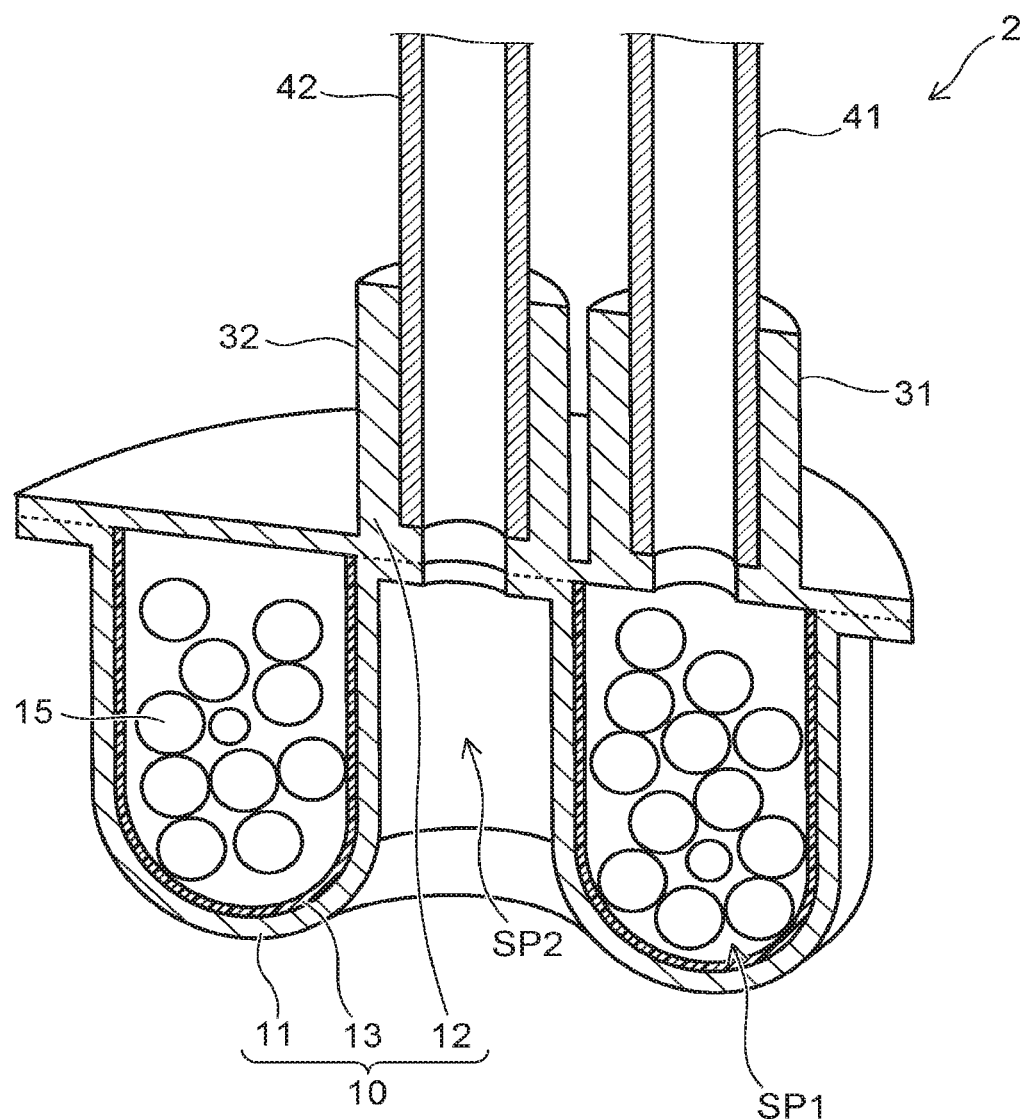
FIG. 6 is a perspective cross-sectional view illustrating a gripping tool according to a first modification of the embodiment.

FIG. 6 is a perspective cross-sectional view illustrating a gripping tool 2 according to a first modification of the embodiment.

The gripping tool 2 illustrated in FIG. 6 differs from the gripping tool 1 in that the holder 20 is not included. Therefore, the first portion 11 and the second portion 12 are fixed at the outer perimeters of the first portion 11 and the second portion 12 by being bonded to each other.

Figure 7:
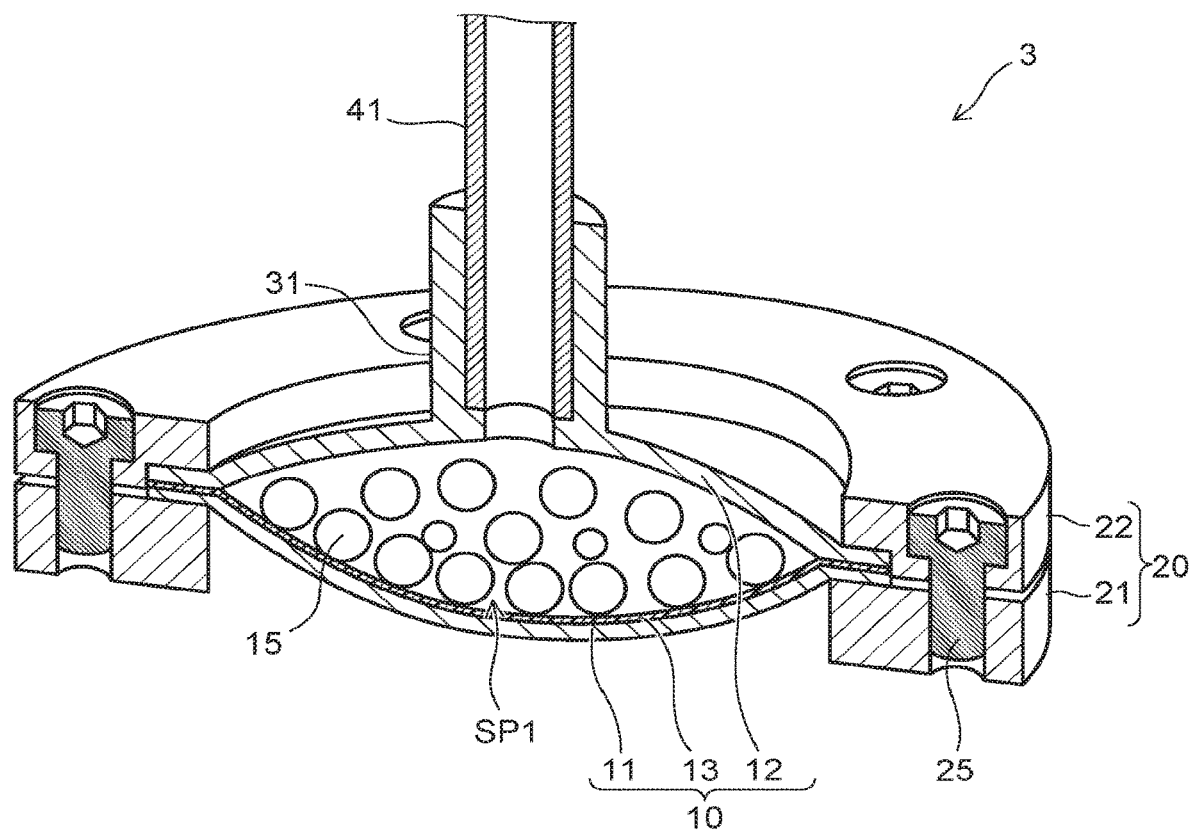
FIG. 7 is a perspective cross-sectional view illustrating a gripping tool according to a second modification of the embodiment.

FIG. 7 is a perspective cross-sectional view illustrating a gripping tool 3 according to a second modification of the embodiment.

In the gripping tool 3 illustrated in FIG. 7, compared to the gripping tool 1, the configuration of the gripper 10 is different; and the second port 32 is not provided.

In the gripper 10, the first portion 11 is curved to be convex downward. The second portion 12 is curved to be convex upward. The granular material is provided in the first space SP1 between the first portion 11 and the second portion 12.

Unlike the gripping tool 1 illustrated in FIG. 1, the first portion 11 of the gripping tool 3 does not include the concave portion 11r and the convex portion 11p. In the gripping tool 3, the second space SP2 is not formed below the first portion 11. The second port 32 is not provided. In the gripping tool 3 according to the modification as well, similarly to the mechanism illustrated in FIGS. 3A to 3D, the gripper 10 is deformable upward with respect to the workpiece W when gripping the workpiece W. The gripping force of the gripper 10 can be increased thereby.

Figure 8:
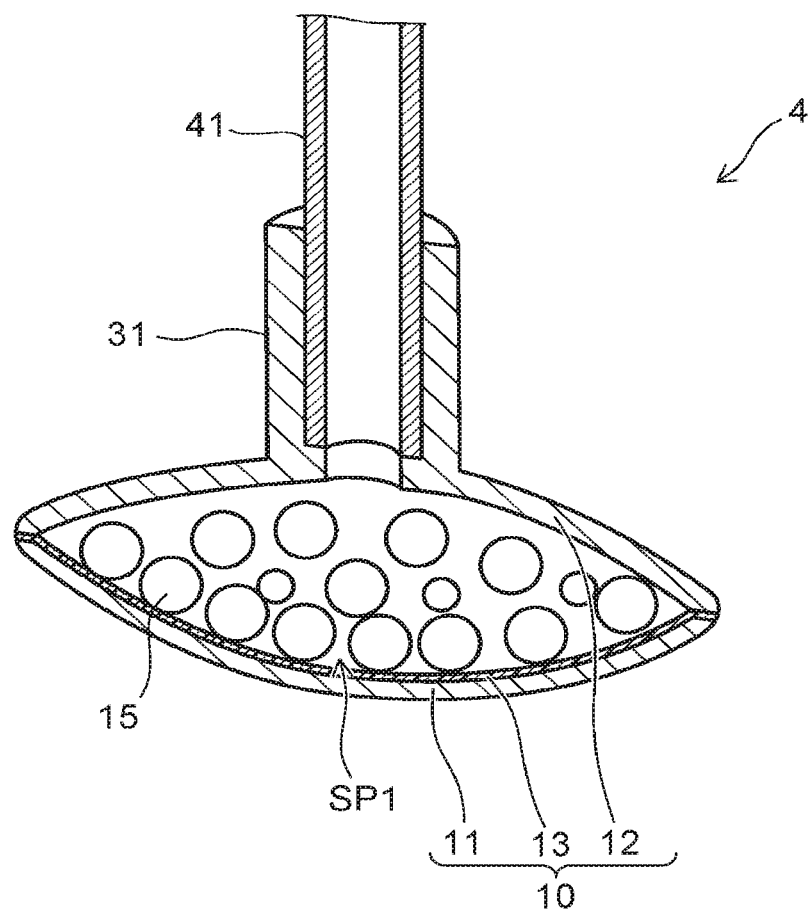
FIG. 8 is a perspective cross-sectional view illustrating a gripping tool according to a third modification of the embodiment.

FIG. 8 is a perspective cross-sectional view illustrating a gripping tool 4 according to a third modification of the embodiment.

The gripping tool 4 illustrated in FIG. 8 differs from the gripping tool 3 in that the holder 20 is not included. The first portion 11 and the second portion 12 are fixed at the outer perimeters of the first portion 11 and the second portion 12 by being bonded to each other.

Figure 9:
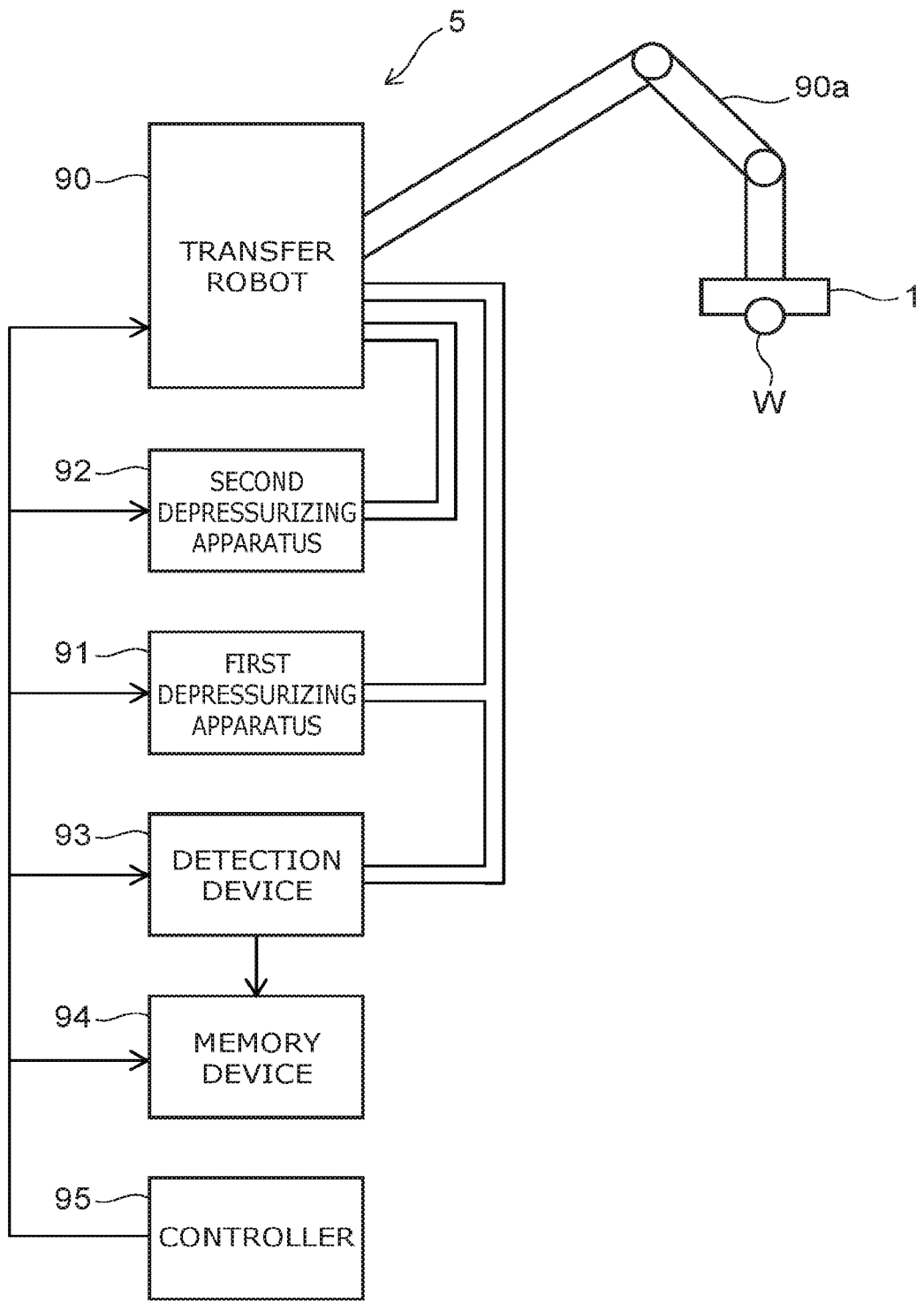
FIG. 9 is a schematic view illustrating a gripping system according to the embodiment.

FIG. 9 is a schematic view illustrating a gripping system 5 according to the embodiment.

The gripping system 5 of the embodiment includes the gripping tool 1, a transfer robot 90, a first depressurizing apparatus 91, a second depressurizing apparatus 92, a detection device 93, a memory device 94, and a controller 95.

The transfer robot 90 includes an arm 90a. For example, the arm 90a includes multiple joints; and the gripping tool 1 is mounted to the tip of the arm 90a. The transfer robot 90 operates the arm 90a according to a command from the controller 95 and grips and transfers the workpiece W.

The first depressurizing apparatus 91 and the second depressurizing apparatus 92 include vacuum pumps, etc. The first depressurizing apparatus 91 is connected to the first pipe 41 of the gripping tool 1 illustrated in FIG. 1. The second depressurizing apparatus 92 is connected to the second pipe 42 of the gripping tool 1. The first space SP1 and the second space SP2 are depressurized and opened to the atmosphere by the first depressurizing apparatus 91 and the second depressurizing apparatus 92 being driven according to commands from the controller 95.

The detection device 93 communicates with the first space SP1. The detection device 93 directly or indirectly detects one of the pressure of the first space SP1 or the flow rate of the gas flowing through the first space SP1 (a first parameter). In the example illustrated in FIG. 9, the detection device 93 is connected to a pipe between the first space SP1 and the first depressurizing apparatus 91. The detection device 93 detects the pressure or the flow rate in the pipe. The gripping system 5 may include multiple detection devices to detect both the pressure and the flow rate of the first space SP1.

The detection device 93 outputs the detection result to the controller 95. In the case where an abnormality is confirmed in the detection result of the detection device 93, the controller 95 notifies the manager of the gripping system 5 of the abnormality and stops the operation of the gripping system 5.

The memory device 94 is a network hard disk, a server file, a hard disk accompanying the detection device 93, etc. The memory device 94 collects and stores the pressure or the flow rate detected by the detection device 93.

The controller 95 includes a CPU (Central Processing Unit), ROM (Read Only Memory), nonvolatile flash memory, etc. Various processing of the controller 95 is performed by the CPU. Various control algorithms, various constants, and the like that are necessary for the operation of the gripping system 5 are stored in the ROM. The transfer procedure, the transfer conditions, and the like of the workpiece W are stored as appropriate in the flash memory.

According to the transfer procedure stored in the flash memory, the controller 95 sends commands to control the operations of the transfer robot 90, the first depressurizing apparatus 91, the second depressurizing apparatus 92, and the detection device 93.

Because the gripping system 5 includes the gripping tool 1, the scattering of the granular material 15 when the gripper 10 ruptures can be suppressed.

The gripping system 5 according to the embodiment may include one of the gripping tools 2 to 4 according to the modifications described above instead of the gripping tool 1. In the case where the gripping system 5 includes the gripping tool 3 or 4, the gripping system 5 may not include the second depressurizing apparatus 92.

A method for detecting the abnormal value of the pressure or the flow rate of the gripping system 5 according to the embodiment will now be described with reference to FIG. 10. Here, a case is described where the pressure of the first space SP1 is detected by the detection device 93.

Figure 10:
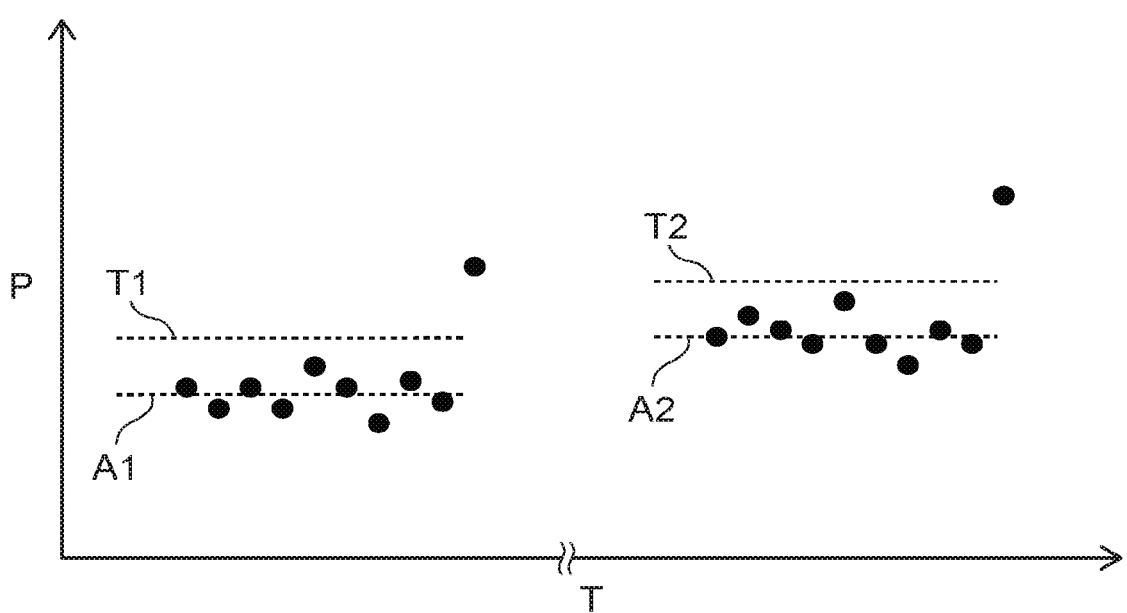
FIG. 10 is a graph illustrating an example of the detection result of the detection device of the gripping system according to the embodiment.

FIG. 10 is a graph illustrating an example of the detection result of the detection device 93 of the gripping system 5 according to the embodiment.

In FIG. 10, the horizontal axis is time; and the vertical axis is the detection result of the pressure at each time.

When the first space SP1 is depressurized by the first depressurizing apparatus 91, the controller 95 determines that an abnormality has occurred in the gripper 10 in the case where a large pressure exceeding a prescribed threshold is detected by the detection device 93.

For example, the threshold is set based on multiple detection results between the current time and a prescribed period of time before the current time. Or, the threshold may be set based on a prescribed number of times of recent detection results.

As one specific example, the controller 95 refers to the memory device 94. As illustrated on the left side in the graph of FIG. 10, the controller 95 extracts a prescribed number of times of recent detection results. The controller 95 calculates an average value A1 of the detection results. Then, the controller 95 uses, as a threshold T1, a prescribed value added to the calculated average value A1. According to this method, the average value A1 and the threshold T1 both change each time a new pressure is detected by the detection device 93.

When a crack occurs in the gripper 10 when depressurizing and air flows into the first space SP1, the pressure that is detected by the detection device 93 increases greatly. When the pressure that is detected by the detection device 93 exceeds the threshold T1, the controller 95 determines that an abnormality has occurred in the gripper 10.

Generally, in a vacuum component for which the depressurizing and the opening to the atmosphere are repeated, the airtightness degrades and the pressure reached when depressurizing increases as the period of use continues. Accordingly, as time elapses as illustrated on the right side in the graph of FIG. 10, the pressure that is detected by the detection device 93 also increases. Accordingly, if the threshold T1 is unchanging, as the period of use of the gripping system 5 continues, there is a possibility that the pressure in the normal operation of the gripping system 5 may be determined to be abnormal.

In the embodiment, the controller 95 sets the threshold based on the detection results stored in the memory device 94. Therefore, even in the case where the gripping system 5 is used for a long period of time and the pressure reached by the first space SP1 changes, the occurrence of the abnormality of the gripper 10 can be determined with higher accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A gripping tool, comprising:
   a gripper, the gripper being flexible; and
   a granular material provided in an interior of the gripper, wherein
   the gripping tool is configured to grip a workpiece by depressurizing the interior of the gripper in a state in which the gripper is caused to contact the workpiece,
   the gripper includes:
      a first portion configured to contact the workpiece;
      a second portion opposing the first portion; and
      a fibrous membrane having a plurality of pores and provided between the first portion and the second portion,
   a diameter of at least a portion of the pores is smaller than a diameter of the granular material,
   the granular material is provided between the fibrous membrane and the second portion,
   the gripping tool further comprises a holder holding an outer perimeter of the first portion and an outer perimeter of the second portion,
   the second portion is configured such that part of the second portion can be deformed toward a first direction more than the outer perimeter of the second portion, and
   the first direction extends from the first portion toward the second portion.

2. The gripping tool according to claim 1, wherein the first portion includes:
   a concave portion recessed toward a first direction, the first direction extending from the first portion toward the second portion; and
   a convex portion protruding toward a second direction and provided around the concave portion, the second direction being opposite to the first direction, and
   at least a portion of the fibrous membrane is provided along the convex portion.

3. The gripping tool according to claim 2, further comprising:
   a first port communicating with a first space, the first space being between the first portion and the second portion;
   a first pipe connected to the first port and configured to depressurize the first space;
   a second port communicating with a second space surrounded with the concave portion and the convex portion; and
   a second pipe connected to the second port and configured to depressurize the second space.

4. The gripping tool according to claim 3, wherein
   the second port penetrates the second portion and the concave portion, and
   a dimension of the concave portion in a direction perpendicular to the first direction is longer than a dimension of a penetrated part of the second portion in the perpendicular direction.

5. The gripping tool according to claim 1, wherein the first portion and the second portion are configured to be deformable along a line direction connecting the first portion and the second portion.

6. The gripping tool according to claim 1, wherein
   the first portion and the fibrous membrane include a portion curved to be convex in a direction away from the second portion, and
   the granular material is provided inside the portion of the fibrous membrane curved to be convex.

7. The gripping tool according to claim 1, wherein the fibrous membrane is bonded to the first portion.

8. The gripping tool according to claim 1, wherein
   the fibrous membrane includes a plurality of resin fibers, and
   a diameter of each of the resin fibers is not less than 50 nm and not more than 10 µm.

9. The gripping tool according to claim 1, wherein the fibrous membrane includes a polymer material comprising at least one selected from polypropylene, polyethylene, polystyrene, polyethylene terephthalate, polyvinyl chloride, polycarbonate, nylon, aramid, polyacrylate, polymethacrylate, polyimide, polyamide-imide, polyvinylidene fluoride, and polyethersulfone.

10. A gripping system, comprising:
    a robot mechanism including an arm;
    a gripping tool mounted to a tip of the arm, the gripping tool comprising:
       a gripper, the gripper being flexible; and
       a granular material provided in an interior of the gripper, wherein
       the gripping tool is configured to grip a workpiece by depressurizing the interior of the gripper in a state in which the gripper is caused to contact the workpiece,
       the gripper includes:
          a first portion configured to contact the workpiece;
          a second portion opposing the first portion; and
          a fibrous membrane having a plurality of pores and provided between the first portion and the second portion,
       a diameter of at least a portion of the pores is smaller than a diameter of the granular material, and
       the granular material is provided between the fibrous membrane and the second portion;
    a first depressurizing apparatus connected to a first space, the first space being between the first portion and the second portion, and the first depressurizing apparatus being configured to depressurize the first space; and
    a controller configured to control operations of the robot mechanism and the first depressurizing apparatus.

11. The gripping system according to claim 10, further comprising a detection device configured to detect a first parameter of the first space, wherein
    the first parameter is a pressure of the first space or a flow rate of a gas flowing through the first space, and
    the controller is configured to determine that an abnormality has occurred in the gripper when the first parameter detected by the detection device exceeds a prescribed threshold.

12. The gripping system according to claim 11, further comprising a memory device configured to store a previous first parameter detected by the detection device, wherein the controller is configured to set the prescribed threshold based on the previous first parameter.

13. A method for manufacturing a gripper, the gripper being flexible and a granular material being provided in an interior of the gripper, the method comprising:
forming a fibrous membrane including a plurality of fibers on one of a first mold or a second mold, the first mold and the second mold being configured to engage each other;
peeling the fibrous membrane from the one of the first mold or the second mold;
disposing a resin material including a high polymer material on one of the first mold or the second mold;
causing the first mold and the second mold to engage;
curing the resin material filled between the first mold and the second mold; and
adhering the fibrous membrane to a surface of the cured resin material where the first mold was disposed.

14. The method according to claim 13, wherein the fibrous membrane is formed by spinning a fiber including a high polymer material.

15. A gripping tool, comprising:
a gripper, the gripper being flexible; and
a granular material provided in an interior of the gripper, wherein
the gripping tool is configured to grip a workpiece by depressurizing the interior of the gripper in a state in which the gripper is caused to contact the workpiece,
the gripper includes:
a first portion configured to contact the workpiece;
a second portion opposing the first portion; and
a fibrous membrane having a plurality of pores and provided between the first portion and the second portion,
the first portion includes:
a concave portion recessed toward a first direction, the first direction extending from the first portion toward the second portion; and
a convex portion protruding toward a second direction and provided around the concave portion, the second direction being opposite to the first direction,
at least a portion of the fibrous membrane is provided along the convex portion,
a diameter of at least a portion of the pores is smaller than a diameter of the granular material,
the granular material is provided between the fibrous membrane and the second portion,
the gripping tool further comprises a port penetrating the second portion and the concave portion and communicating with a space surrounded with the concave portion and the convex portion, and
a dimension of the concave portion in a direction perpendicular to the first direction is longer than a dimension of a penetrated part of the second portion in the perpendicular direction.

16. The gripping tool according to claim 15, wherein the fibrous membrane includes a plurality of resin fibers, and
a diameter of each of the resin fibers is not less than 50 nm and not more than 10 μm.

17. The gripping tool according to claim 15, wherein the fibrous membrane includes a polymer material comprising at least one selected from polypropylene, polyethylene, polystyrene, polyethylene terephthalate, polyvinyl chloride, polycarbonate, nylon, aramid, polyacrylate, polymethacrylate, polyimide, polyamide-imide, polyvinylidene fluoride, and polyethersulfone.

18. A gripping tool, comprising:
a gripper, the gripper being flexible; and
a granular material provided in an interior of the gripper, wherein
the gripping tool is configured to grip a workpiece by depressurizing the interior of the gripper in a state in which the gripper is caused to contact the workpiece,
the gripper includes:
a first portion configured to contact the workpiece;
a second portion opposing the first portion; and
a fibrous membrane having a plurality of pores and provided between the first portion and the second portion,
a diameter of at least a portion of the pores is smaller than a diameter of the granular material,
the granular material is provided between the fibrous membrane and the second portion,
the first portion and the fibrous membrane include a portion curved to be convex in a direction away from the second portion, and
the granular material is provided inside the portion of the fibrous membrane curved to be convex.

19. The gripping tool according to claim 18, wherein the fibrous membrane includes a plurality of resin fibers, and
a diameter of each of the resin fibers is not less than 50 nm and not more than 10 μm.

20. The gripping tool according to claim 18, wherein the fibrous membrane includes a polymer material comprising at least one selected from polypropylene, polyethylene, polystyrene, polyethylene terephthalate, polyvinyl chloride, polycarbonate, nylon, aramid, polyacrylate, polymethacrylate, polyimide, polyamide-imide, polyvinylidene fluoride, and polyethersulfone.

21. A gripping tool, comprising:
a gripper, the gripper being flexible; and
a granular material provided in an interior of the gripper, wherein
the gripping tool is configured to grip a workpiece by depressurizing the interior of the gripper in a state in which the gripper is caused to contact the workpiece,
the gripper includes:
a first portion configured to contact the workpiece;
a second portion opposing the first portion; and
a fibrous membrane having a plurality of pores and provided between the first portion and the second portion,
a diameter of at least a portion of the pores is smaller than a diameter of the granular material,
the granular material is provided between the fibrous membrane and the second portion,
the fibrous membrane includes a plurality of resin fibers, and
a diameter of each of the resin fibers is not less than 50 nm and not more than 10 μm.

22. A gripping tool, comprising:
a gripper, the gripper being flexible; and
a granular material provided in an interior of the gripper, wherein
the gripping tool is configured to grip a workpiece by depressurizing the interior of the gripper in a state in which the gripper is caused to contact the workpiece,
the gripper includes:
a first portion configured to contact the workpiece;
a second portion opposing the first portion; and a fibrous membrane having a plurality of pores and provided between the first portion and the second portion,
a diameter of at least a portion of the pores is smaller than a diameter of the granular material,
the granular material is provided between the fibrous membrane and the second portion, and
the fibrous membrane includes a polymer material comprising at least one selected from polypropylene, polyethylene, polystyrene, polyethylene terephthalate, polyvinyl chloride, polycarbonate, nylon, aramid, polyacrylate, polymethacrylate, polyimide, polyamide-imide, polyvinylidene fluoride, and polyethersulfone.

* * * * *